Nov. 11, 1969 S. E. BOURGHARDT 3,478,326

DEVICES FOR ASSEMBLING IN AN INSTRUCTION MEMORY AN INSTRUCTION WORD TO BE SUPPLIED TO AN APPARATUS CONTROLLED BY LOGIC-CIRCUITS

Filed Sept. 20, 1967 9 Sheets-Sheet 3

Nov. 11, 1969 S. E. BOURGHARDT 3,478,326

DEVICES FOR ASSEMBLING IN AN INSTRUCTION MEMORY AN INSTRUCTION WORD TO BE SUPPLIED TO AN APPARATUS CONTROLLED BY LOGIC-CIRCUITS

Filed Sept. 20, 1967

9 Sheets-Sheet 4

Nov. 11, 1969 S. E. BOURGHARDT 3,478,326

DEVICES FOR ASSEMBLING IN AN INSTRUCTION MEMORY AN INSTRUCTION WORD TO BE SUPPLIED TO AN APPARATUS CONTROLLED BY LOGIC-CIRCUITS

Filed Sept. 20, 1967 9 Sheets-Sheet 6

SVEN ERIK BOURGHARDT,
INVENTOR

By, Wenderoth, Lind and Ponack,
Attorneys

SVEN ERIK BOURGHARDT,
INVENTOR

By, Wenderoth, Lind and Ponack,
Attorneys

United States Patent Office 3,478,326

Patented Nov. 11, 1969

3,478,326

DEVICES FOR ASSEMBLING IN AN INSTRUCTION MEMORY AN INSTRUCTION WORD TO BE SUPPLIED TO AN APPARATUS CONTROLLED BY LOGIC-CIRCUITS

Sven Erik Bourghardt, Askim, Sweden, assignor to Saab Aktiebolag, Linkoping, Sweden Continuation-in-part of application Ser. No. 387,102, Aug. 3, 1964. This application Sept. 20, 1967, Ser. No. 677,820

Claims priority, application Sweden, Aug. 8, 1963, 8,698/63

Int. Cl. G11b *13/00*

U.S. Cl. 340—172.5 5 Claims

ABSTRACT OF THE DISCLOSURE

A device for generating sections of an instruction word and assembling these into a complete word in an instruction word memory. Addressable tables in a table changing and displaying apparatus are displayed one at a time to an operator. Guided by symbols on the displayed table the operator adjusts signal generating means for obtaining primary code signals, and code notations individually associated with the table generate secondary code signals. Said primary and secondary code signals are used for generating a word section and an address for displaying another table for forming a new word section.

This is a continuation-in-part of my copending U.S. patent application Ser. No. 387,102 filed August 3, 1964 and now abandoned.

In the automatisation of widely differing kinds of activities use is now often made of an apparatus controlled by logic-circuits and either itself releasing the activity or causing a machine or the like to effect the activity. The activities may be of practically any conceivable kind whatever. There may be concerned, for example, certain operations of a data processing machine, the actuation of transportation means for fetching requisitioned objects from stores, libraries, card systems, archives etc., the typing of information, the drawing of curves in a curve-writing apparatus, the starting and/or control of a machine tool or other machine, the writing of variable data at a certain moment etc. When an installation shall be able to effect more than one activity, the activity which is desired in each particular case is determined in that a word of instruction of a certain nature is applied to the apparatus controlled by the logic-circuits, that is to say the different activities each have their own word of instruction. As long as a given installation shall be able to carry out but a rather limited number of activities, it is simplest and quickest to search in a list for the instruction word for the activity which it is desired that the installation carries out in each particular case.

However, if an installation is concerned having a very large number of different activities, and particularly when the installation shall be operated by technically rather untrained personnel, it is desirable that the instruction word required in each particular case may be procured by some simple measures not requiring much time on the part of the operator.

The object of the present invention is to make this possible. Thus, the invention provides an apparatus for assembling in cells of a memory of instruction words such an instruction word to be supplied to an apparatus controlled by logic-circuits, comprising a plurality of tables, a table changing apparatus, in which said tables are stored under individual table addresses, a display position, positioning means responding to an electric table address signal for positioning the table corresponding to the table address signal in said display position, a picture window, means for presenting in said picture window to an operator an image of the table localized in said display position, information means located in different information means positions, on each of said tables and interpretable for the operator in said window, each information means representing a part notion of a great many possible instruction words to be supplied to the apparatus controlled by logic-circuits, electrically readable code notations individually associated with each of said tables and belonging to said information means on said tables, reading means for electrically reading said code notations for generating a code notion signal, manually operable code signal generating means, being manually adjustable by the operator into a plurality of operating positions, one for each information means position of any of said tables presented to the operator in said window, for generating one unique electric position code signal for each table information means position, electronic logic-circuits operable (1) by means of the electric position code signal generated upon adjusting said code signal generating means into one of their operating positions and (2) by means of the code notion signal generated by said reading means upon reading the pertaining code notion, for generating (A) the table address signal for table changing and (B) an information signal, and means for transferring the table address signal to said positioning means and for transferring the information signal to cells of the memory of instruction words and storing it in the cells as part of the final instruction word.

For a thorough understanding, the invention will be described in detail in the following with reference to the accompanying drawings which illustrate two embodiments chosen by way of example. In the drawings.

Figure 4:
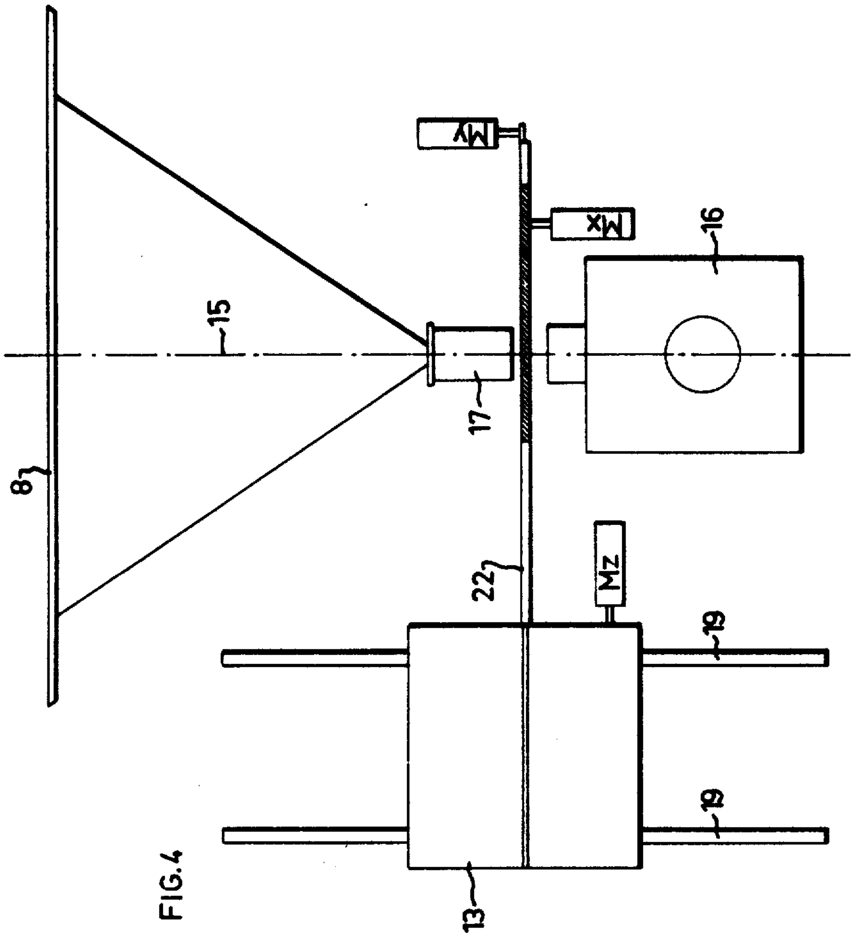
Figure 5:
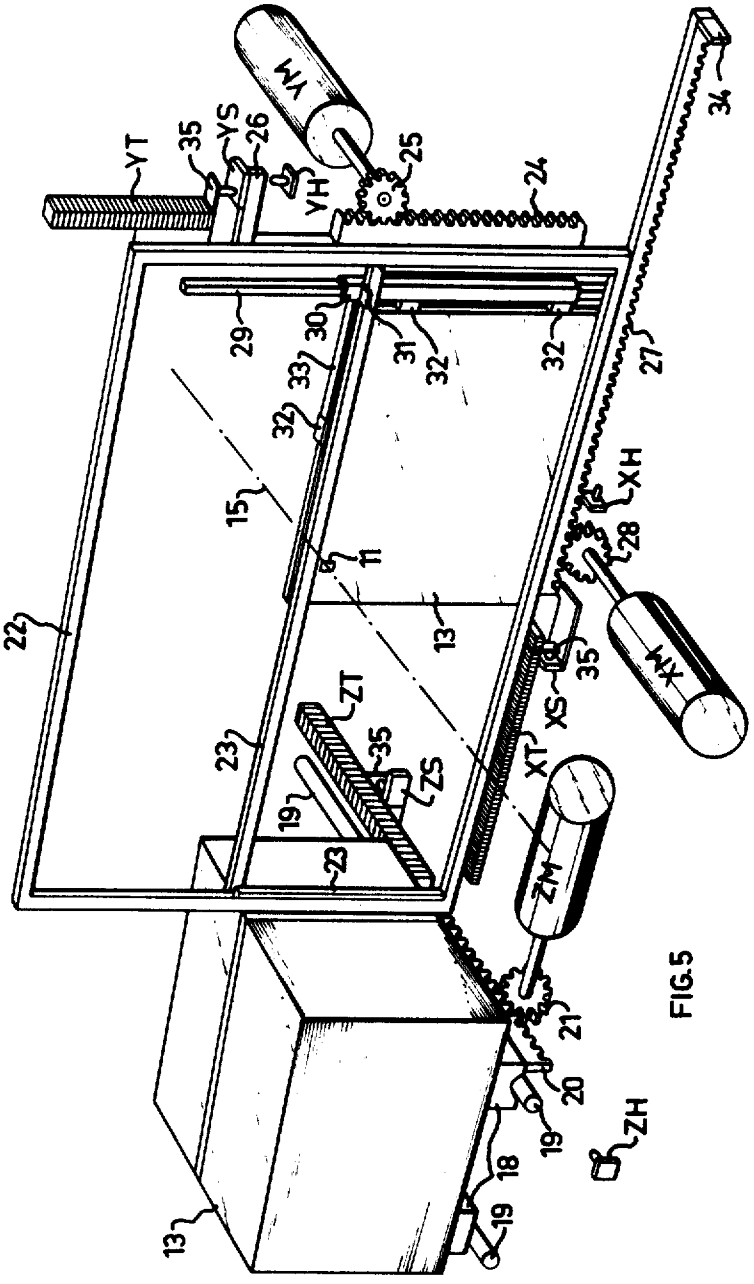
Figure 6:
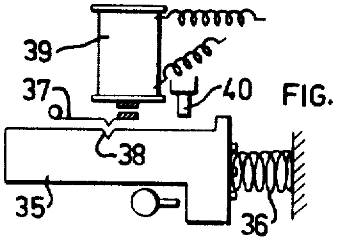
Figure 7:
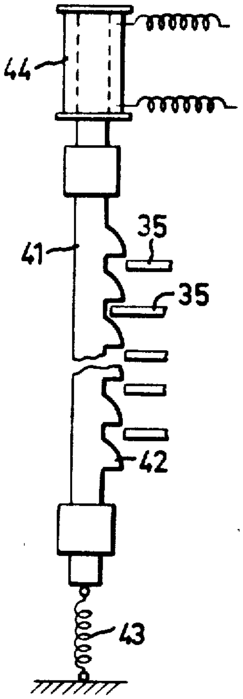
Figure 8:
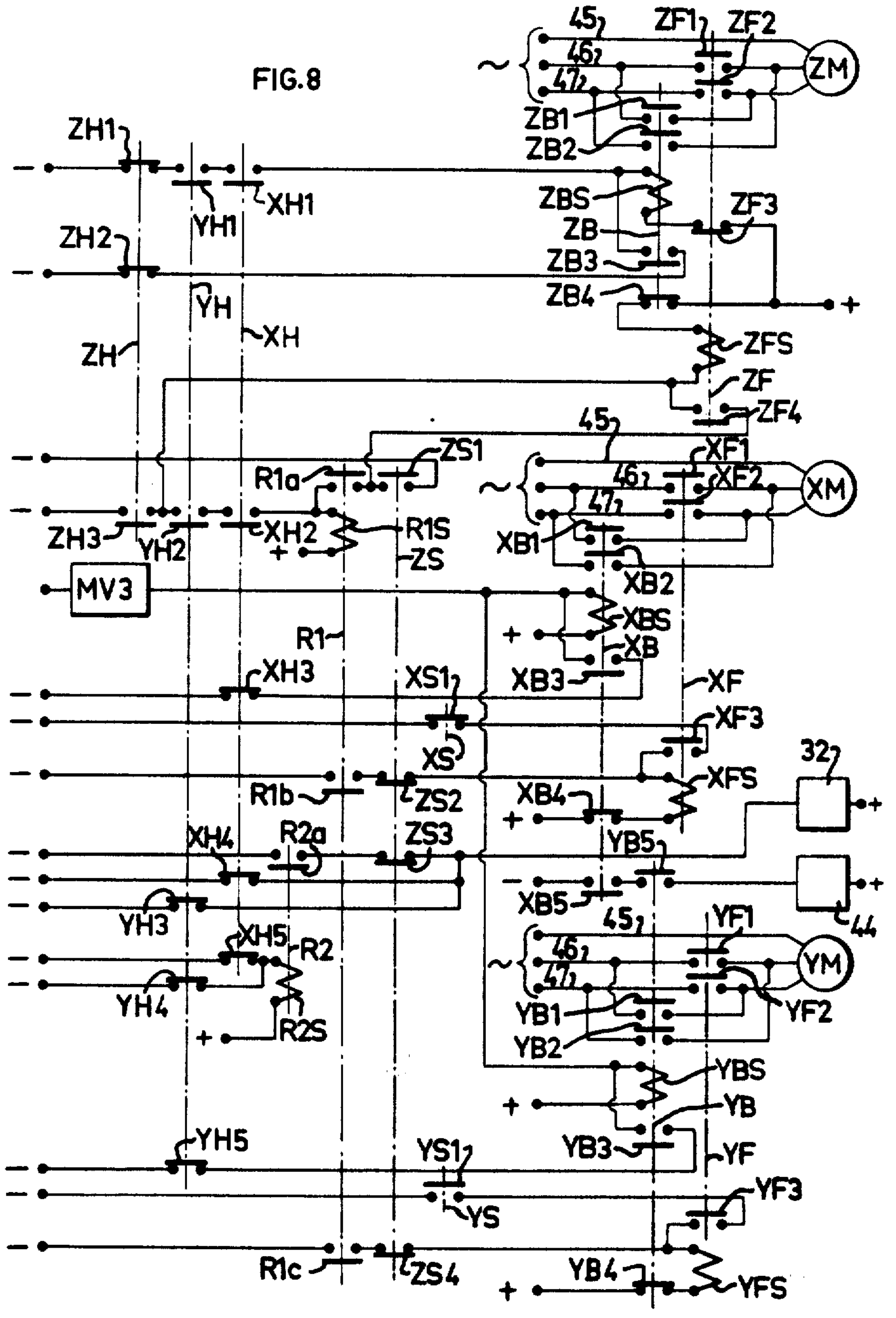
Figure 9:
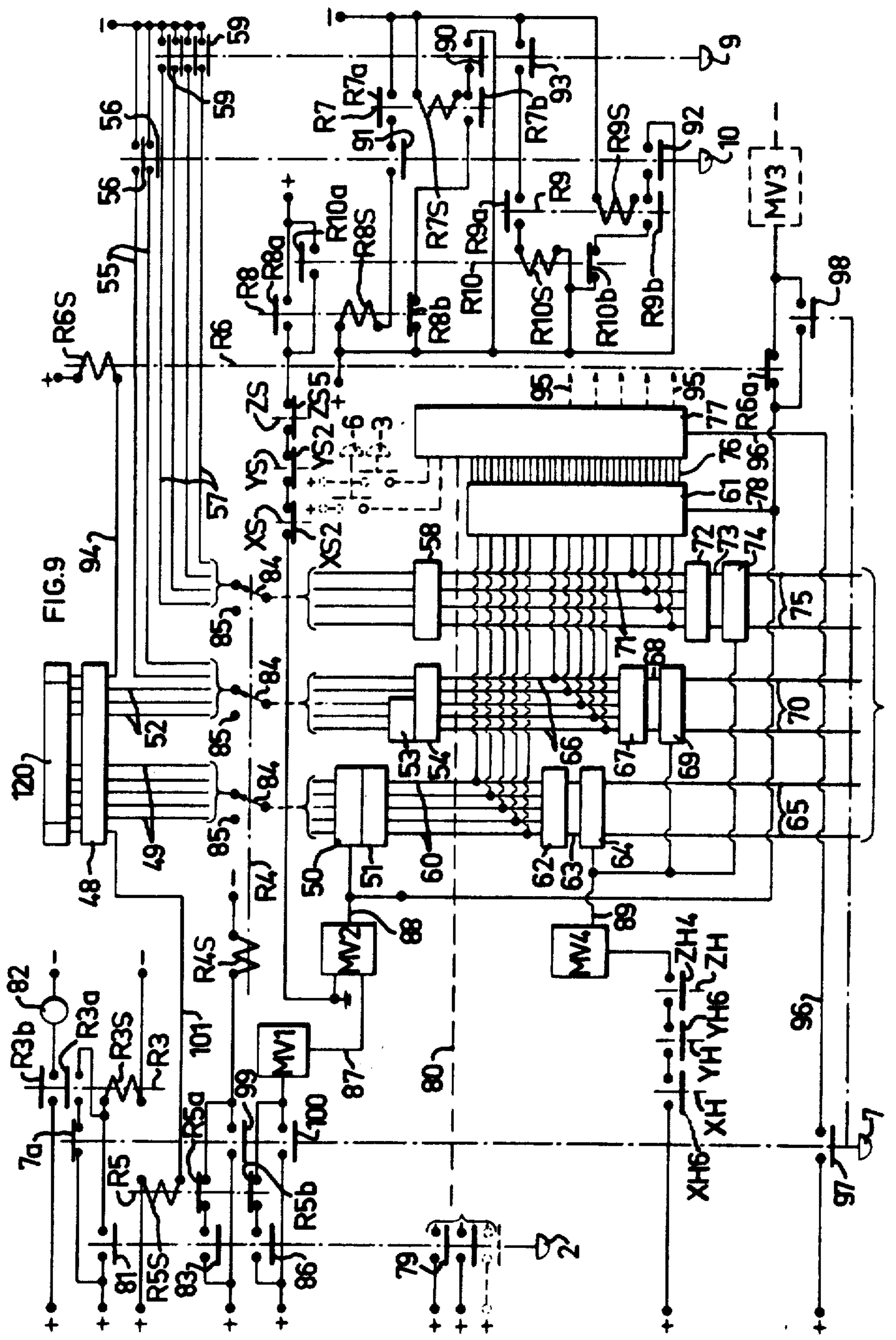
Figure 10:
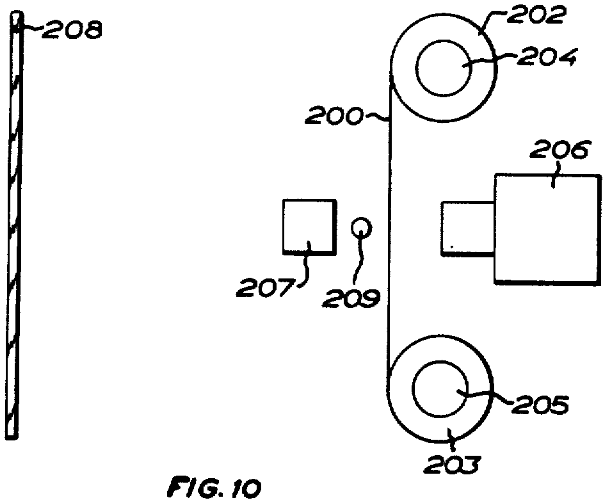
Figure 11:
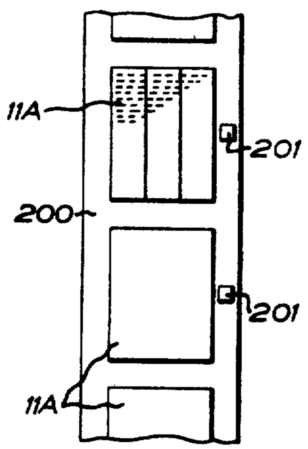
Figure 12:
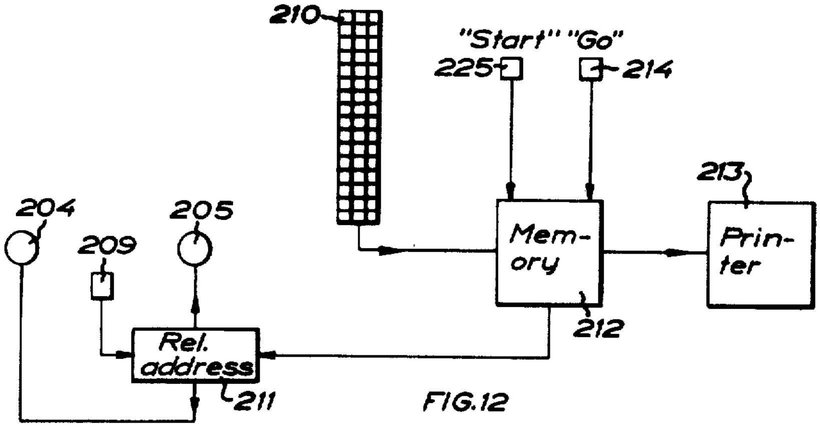
Figure 13:
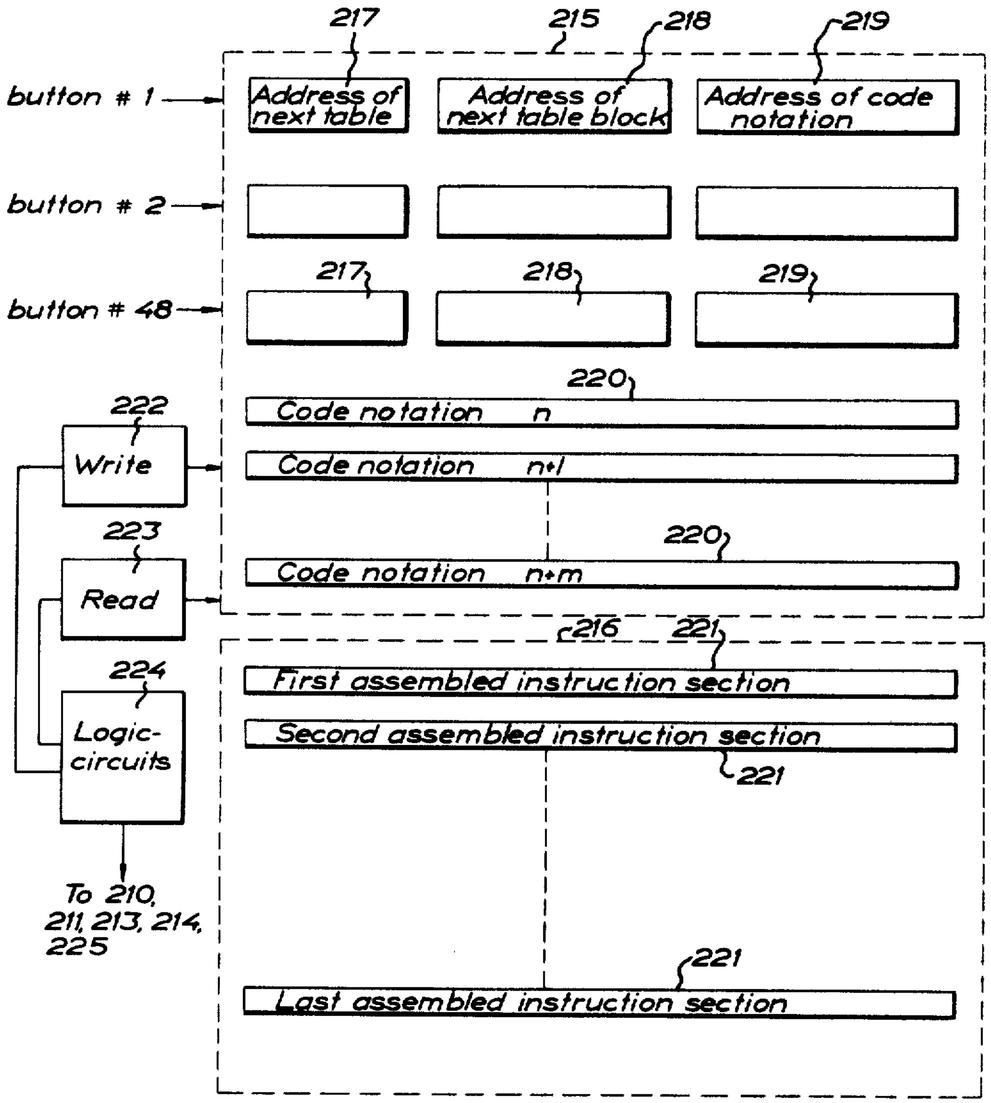

FIG. 4 diagrammatically shows a plan view of a projector for presenting one table at a time of the tables arranged on a plurality of diapositive plates;

FIG. 5 diagrammatically shows a perspective view of an operating mechanism for the diapositive plates in the projecting apparatus according to FIG. 4;

FIG. 6 diagrammatically shows a tabulating device in the operating mechanism according to FIG. 5;

FIG. 7 diagrammatically shows a mechanism resetting the tabulating device according to FIG. 6;

FIGS. 8 and 9 collectively show an electric wiring diagram of the device according to the invention;

FIG. 10 diagrammatically shows a plan view of a film projector of a second embodiment of the invention;

FIG. 11 diagrammatically shows a section of a film used in the projector according to FIG. 10;

FIG. 12 shows a block diagram of the second embodiment of the invention;

FIG. 13 shows the organisation of memory areas in a computer used in the second embodiment of the invention.

The invention will first be elucidated with reference to FIGS. 1 to 9.

Orientation

Although the invention is generally applicable to the assembling of instruction words to be supplied to an apparatus controlled by logic-circuits, a concrete example of the invention will be described in connection with the automatisation of certain activities within a hospital, in which case it is the question of assembling, with the aid of instruction assembling apparatuses set up in the various hospital departments, instruction words for a common electronic data processing machine to cause said machine to effect certain activities, such as typing of messages on electrically remote-controlled typewriting machines set up in various premises of the hospital, for instance for appointing time for the operation or X-ray investigation of a patient, for ordering food or medicine for one or more patients, for typing out the biographical data and/or the complete or partial case history of a certain patient etc. The instruction assembling apparatus set up in a certain hospital department includes an instruction word register and a nurse or doctor in the hospital department in question has to actuate certain switches in the instruction assembling apparatus to cause it to take up in the instruction word register the instruction word that after transfer to the data processing machine causes the latter to perform the activity which is desired in each particular case.

Figure 1:
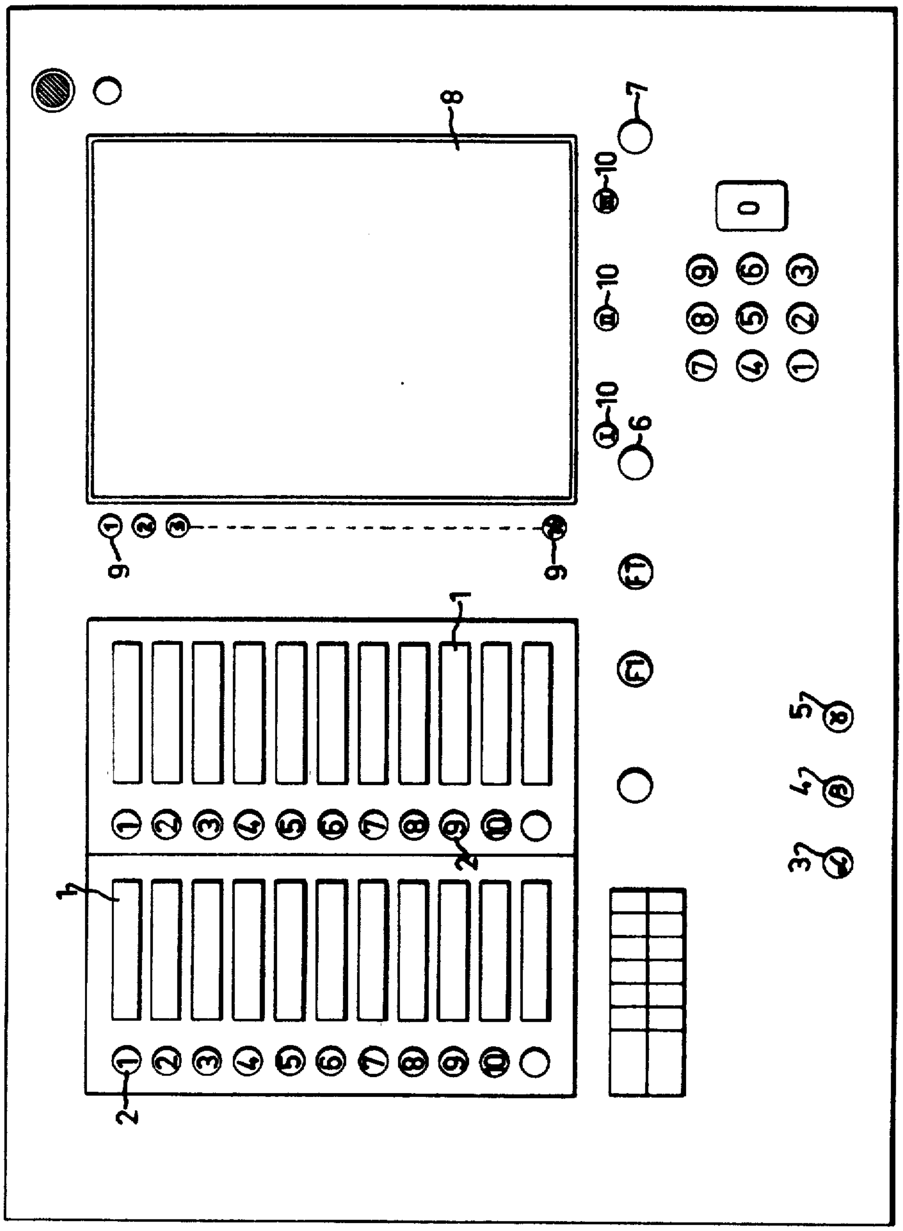
FIG. 1 shows the operating panel of an instruction assembling apparatus.

FIG. 1 shows the operating panel of the instruction assembling apparatus in a hospital department. The panel has a great many push buttons for temporary actuation of switches some of which will be described in the following while other lack importance for the understanding of the invention. The hospital department is assumed to have a room A and a room B each with ten patients. For each patient there is a name plate 1 on the panel and adjacent said name plate is disposed a push button 2 for actuation of a patient switch. By actuation of a push button 2 it is determined that the instruction word to be assembled applies to the patient to which the push button belongs. There are also three push buttons 3–5 for switches which, when actuated, cause the data processing machine to type an extract from or the entire case history of the patient together with his name and number. The push button 3 may for example relate to the typing of the patient's biographical data only, while the push button 4 relates to the typing of both biographical data and a certain part of the case history, whereas the push button 5 relates to the typing of the entire case history. Upon actuation of a push button 6 a switch is closed, which causes the data processing machine to type a message not only on the typewriter in the hospital department, laboratory or the like to which the data are addressed but on the typewriter of the hospital department proper so that this department will have a copy of the message sent. When an instruction word has been finished in the instruction assembling apparatus, the operator presses a "Go" push button 7 which operates a set of switches which among other things sees to it that the instruction word assembled by the instruction word register is transmitted to the data processing machine for controlling it. The operating panel also has a rectangular image screen 8 on which selected tables are presented in sequence in the manner to be described in the following. Each table has forty-eight text positions for accommodating at least forty-eight different texts each relating to one part notion of the different instruction words that may be assembled in the apparatus. The texts are arranged in sixteen lines and three columns. Opposite each line is a line push button 9 for the actuation of a set of line switches, and opposite each column is a column push button 10 for the actuation of a set of column switches. The sixteen line push buttons 9 are disposed in a vertical row adjacent the left margin of the image screen 8, as seen in FIG. 1, and the three column push buttons 10 are disposed in a horizontal row adjacent the lower margin of the image screen 8.

The general operation of the instruction assembling apparatus is as follows. When a message is to be sent about a certain patient in the department, the operator actuates the patient's push button 2, which will insert on one hand the identification of the patient as a first portion of the instruction word in the instruction word register and then a table of the various departments, laboratories etc. of the hospital is presented on the image screen 8. Should a larger or smaller part of the case history also be included in the message, the case history push button 3–5 in question is pressed. The department or the like for which the message is intended is selected from the table presented on the screen 8 in that the operator actuates the line push button 9 and column push button 10 opposite the text regarding the department in question. This will add a part notion of the department in question to the instruction word which is being set up in the instruction word register and also produce a change-over to another table on the image screen 8. This new table may for example take up texts concerning the main parts of the human body. If the message for example concerns the abdominal cavity the operator presses the line and column push buttons 9, 10 opposite the text "abdominal cavity" whereby a part notion is again added to the instruction word being set up in the instruction word register and a change-over takes place to a new table taking up the various organs in the abdominal cavity. In this way the operator proceeds pressing line and column push buttons until the message has reached the desired information amount, whereupon the instruction word assembled in the instruction word register is transferred to the data processing machine to be carried into effect by the operator actuating the "Go" push button 7. It will be evident that the operator can assemble in this, to him simple and readily understandable way, any one of an extremely large number of different instruction words to the data processing machine. By every actuation of a line push button 9 and a column push button 10 the operator establishes on one hand the address of the next table to be presented on the image screen 8 and, on the other hand, an information section of part of the instruction word to be assembled in the instruction word register.

Set of tables

Figure 3:
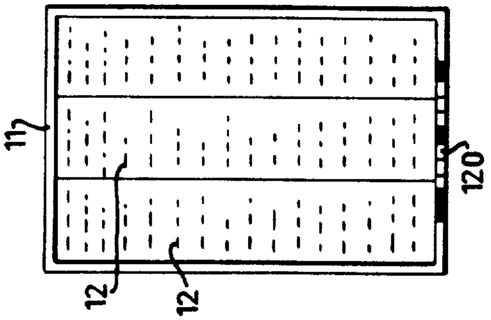
FIG. 3 shows one of the tables.
Figure 2:
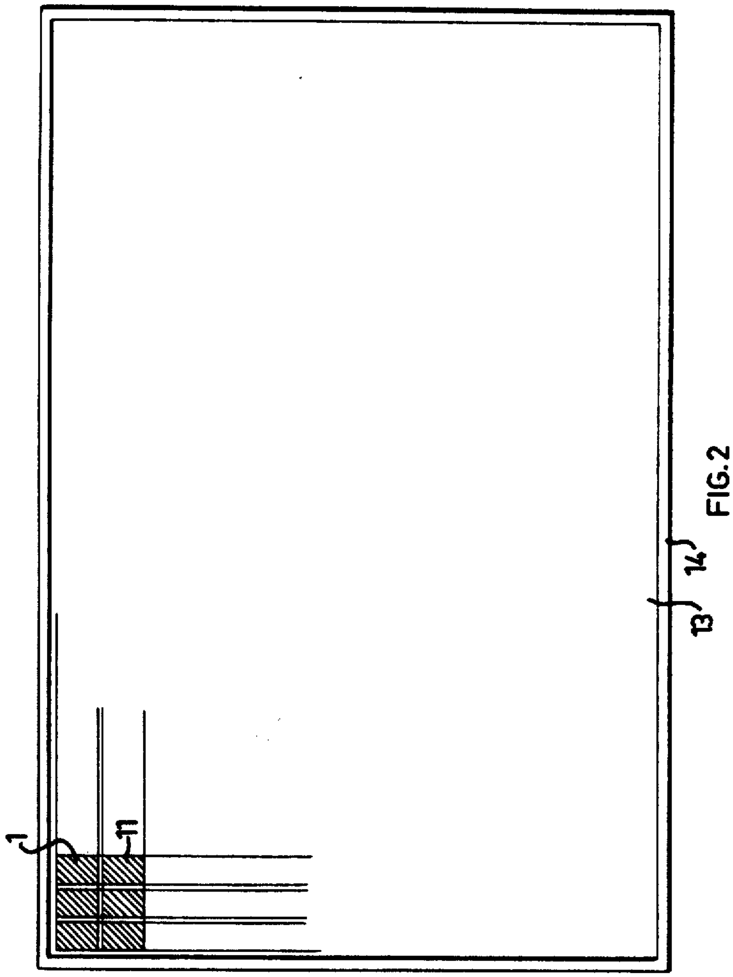
FIG. 2 shows a diapositive plate having a large number of tables.

For the described instruction assembling apparatus there is required a large number of tables to be presented on the image screen 8 (FIG. 1). As will appear from FIG. 3, each table 11 consists of a diapositive having forty-eight text positions 12 arranged in sixteen lines and three columns, and one or more of said text positions has text readable by the operator concerning part notions of instruction words. Outside the text area there are ten aligned rectangles 120 which may either be wholly transparent or almost non-translucent to form a binary code comprising ten bits and readable with the aid of ten photocells. Eight of said rectangles indicate in electrically readable code form a part notion common to the text part notions of the table, while the two remaining rectangles form a binary code for purposes to be described in the following. As will appear from FIG. 2, five hundred and twelve tables according to FIG. 3 are brought together on a diapositive plate 13 in such a way that there are formed sixteen horizontal rows each of thirty-two tables 11. The diapositive plate 13 is equipped with a frame 14 of magnetic material. There are thirty-two such diapositive plates 13 in the instruction assembling apparatus chosen by way of example.

Optical system and table changing mechanism

A table 11 selected for presentation on the image screen 8 is set, as will appear from FIGS. 4 and 5, in the optical axis 15 of an optical system having a lighting means 16 projecting light through the selected table to a lens 17 throwing a magnified picture of the selected table on the image screen or picture window 8 so that the operator can read the text portion on the table. At the same time light is projected through the row of code rectangles 12 to photocells not shown in FIGS. 4 and 5.

The thirty-two diapositive plates 13 are arranged in a stock on a carriage 18 which is movable along guides 19 by means of a rack 20 fixed to the carriage and a pinion 21 driven by a motor ZM. The movement of the stack of plates 13 by means of the motor ZM is said to be performed in the following in the Z-sense or along a Z-coordinate. When the plate stack moves in the Z-sense, it moves at right angles to the plane of a fixedly arranged guide frame 22 outside the frame and adjacent one end of a lateral rod of the frame. In an initial position the carriage 18 or the rack 20 bears against a switch ZH, and from this position the reversible motor ZM is able to move the plate stack to either one of thirty-two stop positions for selecting a given diapositive plate containing a table 11 to be presented in the picture window 8. The thirty-two stop positions along the Z-coordinate are determined by a switch ZS secured to the carriage 18 and by a tabulating device ZT coacting therewith and the construction of which is to be described in the following. Each diapositive plate 13 in said stack is thus addressable by a code which comprises five binary bits and by means of which the tabulator ZT is adjustable.

Mounted on the stationary frame 22 is a frame 23 so as to be movable in the frame 22 in a direction at right angles to the Z-coordinate, said direction being hereinafter referred to as the Y-sense or Y-coordinate. The movement of the frame 23 is effected by means of a rack 24 fixed to the frame 23 and a reversible motor YM with a drive pinion 25. In an initial position a holder 26 fixed to the frame 23 bears against a switch YH, and secured to the holder is a switch YS which cooperates with a tabulating device YT to be able to stop the frame 23 in either one of sixteen stop positions along the Y-coordinate. A diapositive plate 13 carried along by the movable frame 23 can thus be adjusted in the Y-sense by said frame 23 into either of sixteen different positions in relation to the optical axis 15 of the opitcal system, that is each of the sixteen rows of tables on each of the thirty-two diapositive plates 13 is addressable by a code which comprises four binary bits and by means of which the tabulator YT is adjustable.

Mounted for movement along a frame rod of the stationary frame 22 is a rack 27 which is movable at right angles to the Z-coordinate and the Y-coordinate by means of a reversible motor XM and a drive pinion 28. The direction in which the rack 27 is moved shall be designated X-sense or X-coordinate in the following. Secured to the rack 27 is a rod 29 on which a sleeve 30 is movable in the Y-sense. The sleeve 30 carries a lug 31 which engages the frame 23 to partake in its movement in the Y-sense. Also secured to the sleeve 30 are two electromagnets 32 and an arm 33 which carries a further electromagnet 32. When supplied with current the electromagnets 32 can grasp and retain a diapositive plate 13 by attraction of the frame 14 thereof (FIG. 2) which is of magnetic material. The rack 27 has a lug 32 which in an initial position of the rack 27 bears against a stationary switch XH. Also secured to the rack 27 is a switch XS which cooperates with a stationary tabulating device XT for stopping the rack 27 and thus the rod 29 in either one of thirty-two different stop positions. A diapositive plate 13 retained by one of the electromagnets 32 can thus be adjusted in the X-sense into either one of thirty-two positions corresponding to the thirty-two columns of tables 11 (FIG. 2) on the diapositive plate. In other words, each table 11 on each diapositive plate 13 is address in the X-sense by means of a binary code which comprises five bits and by means of which the tabulating device XT is adjustable.

By supplying the tabulating devices ZT, YT and XT with the requisite code words any table 11 whatever can thus be selected on the diapositive plates 13.

The three tabulating devices ZT, YT and XT are similar to the tabulating device of an ordinary typewriter and have the design diagrammatically shown in FIGS. 6 and 7. For each desired stop position there is a tabulator stop plate 35 which is displaceably mounted on a tabulator frame (not shown) and which is retained against the action of a pressure spring 36, in an inoperative position by a resilient pawl 37 engaging a notch 38 in the tabulator stop plate. The pawl 37 can be momentarily swung out of latching position by means of a solenoid 39 so that the pressure spring 36 is allowed to urge the tabulator stop plate 35 to the left in FIG. 6 into an operative position in bearing contact with a stop abutment 40 on the tabulator frame. In this operative position the tabulator stop plate 35 projects into the path of movement of the switch ZS, YS and XS, respectively, cooperating with the tabulating device.

Also mounted in the frame of the tabulating device is a restoring rod 41 extending along the rod of tabulator stop plates 35 and having, as will appear from FIG. 7, a cam tooth 42 for each stop plate 35. When a tabulator stop plate has been urged into operative position it also engages in a gap between two successive cam teeth on the restoring rod 41. For restoring the tabulating device, the rod 41 can be momentarily moved from the initial position shown in FIG. 7 against the action of a tension spring 43 approximately through one tooth pitch by means of a solenoid 44. At such a movement a tabulator stop plate 35 set into operative position will be cammed back into inoperative position.

The electric wiring diagram and mode of function of the table charging device FIG. 8 shows the electric wiring diagram of the table changing device shown in FIG. 5. The three motors ZM, XM and YM for setting in the Z-sense, X-sense and Y-sense, respectively, are shown as reversible three-phase motors, the direction of rotation of which is determined by two relays for each motor, viz, one relay ZB, XB and YB, respectively, for reversing, that is movement from a stop position to the initial position, and one relay ZF, XF and YF, respectively, for forward movement, that is movement from the initial position to a stop position. One phase conductor 45 from a three-phase mains is constantly connected to each of the motors ZM, XM and YM while the two other phase conductors 46 and 47 are connected according to FIG. 8 to make contacts ZB1, ZF1 and ZB2, ZF2, respectively; XB1, XF1 and XB2, XF2, respectively; YB1, YF1 and YB2, YF2, respectively, in such a manner that the two phase conductors are connected to the respective motor in opposite ways when operating the reversing relay and the forward movement relay. The relays for reversing and forward movement also include further make or break contacts which will be described according as they are of importance to the function of the device.

The wiring diagram according to FIG. 8 also includes several contacts in the earlier described switches ZH, YH, XH, ZS, XS and YS as well as two relays R1 and R2 with associated contacts, the set of electromagnets 32 for retaining a diapositive plate 13, and the set of coils 44 for restoring the tabulator stop plates 35 into inoperative position. There is also shown a monostable trigger circuit MV3 which serves to initiate a table changing operation. How the trigger circuit MV3 is actuated will be described in the following.

FIG. 8 shows the device at rest with a table 11 in position for presentation in the picture window 8. The switches ZS, XS and YS are actuated by tabulator stop plates 35 occupying operative position, while the switches ZH, XH and YH are unactuated, that is the table changing mechanism takes for example the position shown in FIG. 5. The magnets 32 retaining the diapositive plate 13 are energized from the negative pole of a current source not shown over closed break contacts YH3, XH4 in the unactuated switches YH and XH, respectively, and by the electromagnets to the positive pole of the current source to that the diapositive plate is retained by the electromagnets. Break contacts YH4 and XH5 in the switches YH and XH also close circuits through the coils R2S of the relay R2 so that this relay is operated and keeps a break contact R2*a* open.

When a pulse releasing a table change is supplied, in the manner described in the following, to the monostable trigger circuit MV3, the rearward flank of the pulse will release a negative starting pulse in the output of the trigger circuit which is connected to one terminal of the operating coils XBS and YBS, respectively, of the relays XB and YB the other terminals of which are connected to the positive pole of the current source. This will make the relays XB and YB operative with self-holding with the aid of the make contact XB3 and YB3, respectively, of the relays which is connected to the negative pole of the current source over a break contact XH3 and YH5, respectively, in the switch XH and YH, respectively. At the operation of the relays XB and YB the motors XM and YM are started in the reversing direction by the make contacts XB1, XB2 and YB1, YB2, respectively, being closed. This will return the diapositive plate 13 (FIG. 5) carried by the electromagnets 32 towards the plate stack. At the operation of the relays XB and YB the break contacts XB4 and YB4 thereof break the connection between the positive pole of the current source and one terminal of the operating coils XFS and YFS of the relays XF and YF so that these relays for forward movement cannot be operated so long as the relays XB and YB for reversing are operated. In addition the make contacts XB5 and YB5 of the relays XB and YB are closed for establishing in series a closed circuit through the coils 44 for restoring into inoperative position the tabulator stop plates 35 occupying operative positions. This will restore the stop switches ZS, XS and YS, the break contacts ZS1, XS1 and YS1 being closed and the make contacts ZS2, ZS3 and ZS4 being opened, but this has no immediate effect.

Either one of motors XM and YM can be the first to complete its reversing movement but it is here assumed that it is the motor YM which first reaches the end of its reversing movement. When the movement in the Y-sense reaches the initial position, the switch YH is actuated so that the make contacts YH1 and YH2 are closed whereas the break contacts YH3, YH4 and YH5 are opened. The adjustment of the contacts YH1–YH4 has no immediate effect, whereas the breaking of the contact YH5 results in the holding circuit of the relay YB being opened so that the motor YM is stopped by the relay YB falling off. When the relay YB falls off, the make contact YB5 is opened so that the restoring coils 44 are deenergized and the rods 41 (FIG. 7) return to inoperative position whereby the tabulator devices are ready for moving new tabulator stop plates 35 into operative position for controlling the next movement of a table 11 into position of presentation.

When also the movement in the X-sense reaches the initial position the switch XH is actuated so that the make contacts XH1 and XH2 are closed and the break contacts XH3, XH4 and XH5 are opened. By the opening of the contact XH3 in the holding circuit of the relay XB the relay XB will be deenergized so that the motor XM stops. By the opening of the contact XH5 the relay R2 will be deenergized because the contact YH4 has already been opened. This will close the break contact R2*a* but this has no immediate effect because the contact ZS3 connected in series therewith is open. As the contacts ZS3 and YH3 have already been opened, the opening of the contact XH4 results in a deenergization of the electromagnets 32 so that they release the plate 13 returned by the motors XM and YM in the manner described to the plate stack, and said plate 13 now occupies its given position in the plate stack.

Now the carriage 18 with the plate stack can be returned to the initial position by means of the motor ZM. This is done as follows. When the contact XH1 is closed in the manner earlier described a circuit is closed through the operating coil ZBS of the relay ZB from the negative pole of the current source through the break contact ZH1 of the unoperated switch ZH, the make contact YH1 already closed, the make contacts XH1 now closed, the coil ZBS, a break contact ZF3 in the relay ZF to the positive pole of the current source. The relay ZB is thus energized and by means of its make contacts ZB1 and ZB2 causes the motor ZM to rotate in the reversing direction to move the stack of plates 13 into initial position. The operation of the relay ZB takes place with self-holding over the make contact ZB3 and the break contact ZH2 connected to the negative pole of the current source. At the operation of the relay ZB the break contact ZB4 will also be opened so that the relay ZF cannot be operated for forward movement while reversing is in progress.

When the plate stack reaches initial position the switch ZH is actuated so that the break contacts ZH1 and ZH2 are opened and the make contact ZH3 is closed. The opening of the break contact ZH1 and ZH2 results in a deenergization of the relay ZB so that the motor ZM stops and one end of the operating coil ZFS of the relay ZF is connected to the positive pole of the current source over the break contact ZB4. Closing of the make contact ZH3 now causes the relay ZF to be operated since the other end of the coil ZFS is connected to the negative pole of the current source by means of the contact ZH3. The operation of the relay ZF will start the motor ZM in the forward direction with the aid of the contacts ZF1 and ZF2 while the break contact ZF3 separates the operating coil ZBS from the positive pole of the current source so that the relay ZB for reversing cannot be operated so long as the relay ZF for forward movement is operated. The relay ZF is operated with self-holding over the make contact ZF4 and the break contact ZS1 now closed, as earlier described, so that the relay ZF remains in operation although the make contact ZH3 is opened as soon as the plate stack leaves the initial position in the forward direction. At the described closing of the contact ZH3 the relay R1 will also be operated in that its operaitng coil R1S is supplied with current from the negative pole of the current source through the closed contacts ZH3, YH2 and XH2, and the coil R1S to the positive pole of the current source. The relay R1 is operated with self-holding through the make contact R1*a* and the closed break contacts ZS1 so that the relay R1 will remain operated also after the make contact ZH3 has been opened. At the operation of the relay R1 the make contacts R1*b* and R1*c* also are closed, but this has no immediate effect since the make contacts ZS2 and ZS4 connected in series therewith are then open.

Already before the operation of the motor ZM in the forward direction a new tabulator stop plate 35 has been adjusted in the manner described in the following into operative position in the tabulating device ZT. When the forward movement of the plate stack in the Z-sense reaches the new stop position the tabulator stop plate occupying operative position actuates the switch ZS so that the contacts thereof are set into the position shown in FIG. 8. This will cause the contact ZS1 to break the self-holding of the relays ZF and R1. The motor ZM is immediately stopped but the relay R1 is caused to release with delay. As a consequence the operating coils XFS and YFS of the relays XF and YF will for a short period be supplied with current from the negative pole of the current source through the still closed relay contacts R1*b* and R1*c*, the now closed contacts ZS2 and ZS4, the relay coils XFS and YFS, and the break contacts XB4, YB4 of the deenergized relays XB and YB to the positive pole of the current source. The relays XF and YF are thus operated and remain operated although the contacts R1*b* and R1*c* are opened after a short period since the relays XF and YF are operated with self-holding over the make contacts XF3, XF3 and the closed break contacts XS1 and YS1 in the stop switches XS and YS.

As a result of the contact ZS3 being closed at the arrival of the plate stack in the new stop position current will be supplied to the electromagnets 32 from the negative pole of the current source through the closed break contact R2*a*, the contact ZS3, the electromagnets 32 to the positive pole of the current source so that the plate 13 selected by means of the tabulating device ZT is grasped by the electromagnets and begins to be advanced in the X-sense and the Y-sense when the motors XM and YM are initiated in the forward direction by the make contacts XF1, XF2, YF1 and YF2 of the operated relays XF and YF. When the racks 24 and 27 (FIG. 5) leave the initial position the break contacts XH5 and YH4 of the switches XH and YH are closed so that the operating coil R2S of the relay R2 will be energized. This will open the break contact R2*a* with delay. Prior to the opening of the contact R2*a* the break contacts XH4 and YH3 of the switches XH and YH will have time to close so that the supply of current to the electromagnets 32 is maintained without interruption in spite of the contact R2*a* being opened.

Prior to the initiation of the motors XM and YM in the forward direction a tabulator stop plate 35 has been set, in the matter to be described in the following, into operative position in each of the tabulating devices XT and YT (FIG. 5) to determine the extents of the forward movements in the X-sense and the Y-sense. When the switches XS and YS reach the set tabulator stop plates the break contacts XS1 and YS1 will be opened whereby the earlier described holding circuits of the relays XF and YF over the contacts XF3 and YF3 will be opened to that the relays XF and YF are deenergized and the motors XM and YM stop with the selected table 11 (FIG. 5) in position of presentation. The device according to FIG. 8 now again occupies the state shown in FIG. 8 until a new change of tables is to take place.

Selection of tables and assembly of instruction words

Each is selected for presentation in the picture window 8 by a Z address being sent to the tabulating device ZT, an X address to the tabulating device XT and a Y address to the tabulating device YT in FIG. 5 so that the tabulator stop plates 35 necessary for the selection are set into operative position and the table changing device performs the operations described in connection with FIG. 8. For the X address which comprises thirty-two positions there are required five binary bits and these are obtained from five of the rectangles 120 (see also FIG. 3) on the table 11 then occupying the position of a presentation. The said rectangles are read by five photocells in a photo reader 48 (FIG. 9). The signals from these five photocells can be fed, in the manner to be described in the following, by means of five conductors 49 and a gate set 50 into a holding register 51, "the X register," for storing the X address, as will appear from FIG. 9. It should be stressed here that the X address read from a presented table is the X address of the next table to be presented. For the Z address which comprises thirty-two positions there are also required five binary bits. Three of these bits are obtained from three rectangles 120 read by three photocells in the photocell reader 48. The signals from these three photocells can be fed by means of conductors 52 and a gate set 53 into a holding register 54 "the Z register" for storing the Z address. The two remaining bits of the Z address are supplied directly to the Z register while bypassing the gate set 53 by means of two conductors 55 which can be energized and deenergized in three different combinations with the aid of the column push buttons 10 (see also FIG. 1) which control make contacts in the conductors 55. FIG. 9 shows but one of the column push buttons 10, which has two make contacts 56 to energize both conductors 55, while the two pushbuttons 10 not shown in FIG. 9 have but one make contact 56 in one and the other conductor 55, respectively. Also in the case of the Z address naturally the address of the table is concerned which is to be presented next time. For the Y address which comprises sixteen positions there are required four binary bits. These are obtained from the sixteen line push buttons 9 (see also FIG. 1) that actuate make contacts in four conductors 57 which, in the manner to be described in the following, are connectible directly to a holding register 58, "the Y register," for accommodating the Y address as will appear from FIG. 9. The make contacts of the sixteen line push buttons are arranged in the sixteen different combinations possible, and in FIG. 9 there is only shown the line push button 9 which has four make contacts 59 to make all four conductors 57 current-carrying. Also the Y address selected by means of a line push button 9 of course is concerned with the table to be presented next time.

The five outputs from X register are connected by five conductors 60, as will appear from FIG. 9, to a gate set 61 controlled by a shift register and to a diode matrix 62 which converts the binary information of the X-register into a signal in either one of thirty-two conductors 63 leading to a gate set 64 which, in the manner to be described in the following, at a given time forwards the signal from the diode matrix 62 to either one of thirty-two conductors 65 each of which leads to one of the coils 39 (FIG. 6) in the tabulating device XT (FIG. 5) for determining the X address of the next table to be presented. For the sake of simplicity there is shown in FIG. 9 only two of the conductors 63 and 65, respectively. In a corresponding manner, the five outputs of the Z register are connected by means of five conductors 66 to the gate set 61 controlled by the shift register and to a diode matrix 67 for converting the binary information of the Z register to a signal in either one of thirty-two conductors 68 (only two are shown in FIG. 9) which over a gate set 69 and thirty-two conductors 70 (but two are shown in FIG. 9) are each connected to a coil 39 in the tabulating device ZT (FIG. 5) for determining the Z address of the following plate 13 which is to be set into position of presentation. The four outputs of the Y register are also connected by four conductors 71 on one hand to the gate set 61 controlled by the shift register and on the other to a diode matrix 72 which over sixteen conductors 73 (only two are shown in FIG. 9) and a gate set 74 is connected to sixteen conductors 75 (only two are shown in FIG. 9) which lead to the sixteen coils 39 in the tabulating device YT (FIG. 5) for determining the Y address of the following table to be presented.

In the embodiment chosen, there is thus utilized the entire information present in X, Z and Y registers for the selection of the next table to be presented, but of course it would also be possible to design the device in such a way that only part of this amount of information is utilized for the selection of tables. The shift register and gate set unit 61 is so designed that for each table and thus each information contents in the X, Z and Y registers at least a certain part of this amount of information is fed over conductors 76 into an instruction word register 77. The shift register controls the gate set in such a way that the information for each table is entered into new not earlier fitted cells in the register 77, and the amount of information fed thereinto in each particular case may be different for the different tables. The adjustment of the shift register for control of the gate set in different ways in the different cases takes place in the manner described in the following over a shift input line 78.

When an instruction word has been set up completely in the instruction word register 77 the operator sends this instruction word to the apparatus or the like to be controlled by means of the instruction word or to store the instruction word until it is to be used for control, by actuation of the performance or "Go" push button 7 (FIGS. 1, 9), a change of tables being effected to the initial table, that is in the present instance a table over the wards of the hospital. To facilitate the continued description it is, however, assumed that the operator at the immediately preceding use of the apparatus did not for some reason press the "Go" push button 7. The parts the occupy the state shown in FIG. 9. When the apparatus is now to be used the operator first presses a patient's button 2 (FIG. 9). The different patient buttons 2 operate different combinations of make contacts 79 for feeding, over one or more lines diagrammatically indicated in FIG. 9 by a broken line 80, a code characteristic for the patient in question into certain cells of the instruction word register 77 as the first portion of the instruction word to be set up. The patient's button 2 pressed also closes a make contact 81 so that the coil R3S of a relay R3 is supplied with current through the contact 81, the relay R3 being operated with self-holding by the closing of a relay make contact R3*a* which connects the positive pole of the current source with the relay coil R3S via a break contact 7*a* operated by the "Go" push button 7. At the operation of the relay R3 there is also closed a make contact R3*b* which supplies current to the lamp 82 of the lighting device 16 (FIG. 4). The patient's button 2 pressed also closes a make contact 83 which results in the operation of a relay R4 in that the coil R4S of the relay is connected to the current source from the positive pole thereof over the contact 83, a break contact R5*a* in a relay R5, and the coil R4S to the negative pole of the current source. The relay R4 is thus operation and adjusts fourteen switching contacts 84 (but three are shown in FIG. 9) into application with fourteen fixed contacts 85 (only three are shown in FIG. 9) which are connected to fixed voltages in such a way that they represent the address of the initial table, that is the table of the different wards of the hospital. The Y address and two binary bits of the Z address are fed directly into the Y and Z registers 58, 54 while three binary bits of the Z address and the full X address are applied to the gates 50 and 53 and fed into the X and Z registers 51, 54 only after the gate sets 50, 53 have been opened by a gate pulse. This gate pulse is obtained as follows. When the patient's push button 2 is actuated a make contact 86 is closed, which temporarily connects the positive pole of the current source to a monostable trigger circuit MV1 through a break contact R5*b* in the relay R5. The trigger circuit MV1 operates with such a delay that the relay R4 will have time to be set in the manner described before a pulse in the output line 87 of the trigger circuit operates a monostable trigger circuit MV2 in such a way that this circuit over its output line 88 delivers a pulse which opens the gates in the gate sets 50, 53 for feeding the X address and part of the Z address into the registers 51 and 54. The pulse from the trigger MV2 is also led to the shift input 78 of the shift register and gate set unit 61 so that the complete X, Z and Y addresses now standing in the registers 51, 54, 58 are fed in their entirety or to certain parts into predetermined cells of the instruction word register 77. The pulse from the trigger circuit MV2 is also passed over a break contact R6*a* in a deenergized relay R6 to the trigger circuit MV3 described in connection with FIG. 8 and also indicated by broken lines in FIG. 9. This will cause the table changing device of the trigger circuit MV3 to perform a change of tables, which takes place in the earlier described manner, so that the initial table of the wards of the hospital is set into position of presentation and becomes visible in the picture window 8. In order that the correct table may be set into position of presentation the address of this table has to be set in the tabulating devices ZT, XT and YT (FIG. 5) with the aid of the address information in the registers 51, 54, 58. This address information is kept by the said registers applied to the gate sets 64, 69, 74 over the diode matrices 62, 67, 72 but the gates are only opened when the reversing movements in the X-, Y- and Z-senses have reached the initial position when make contacts XH6, YH6 and ZH4 in the earlier mentioned switches XH, YH and ZH are closed so that the positive pole of the current source is connected to a monostable trigger circuit MV4 which as a result sends a pulse through its output line 89 to open the gate sets 64, 69, 74 for current supply to the three coils 39 in question (FIG. 6) in the tabulating devices ZT, XT and YT (FIG. 5).

When the initial table has reached the position of presentation the operator can select the desired text notion in this table by pressing the line and column push buttons 9, 10 opposite the text notion. The two push buttons 9 and 10 selected shall permit being pressed in any desired sequence, and a signal to be described in the following which is delivered to the trigger circuit MV2 shall be obtained only after the two push buttons have been pressed. For this purpose I have provided the following arrangement (which will appear from FIG. 9). To begin with, I shall consider the case when the push button 9 is pressed first. Each push button 9 has a make contact 90 which when closed results in current being supplied to the relay coil R7S of a relay R7. The relay R7 is thus operated and is held energized over a make contact R7*b* of the relay R7 and a break contact R8*b* of a deenergized relay R8. The operation of the relay R7 will also close a make contact R7*a*. Each push button 10 in addition has a make contact 91 which is closed when the respective push button 10 is actuated. When the make contact 91 is closed current is supplied to the coil R8S of the relay R8 from the negative pole of the current source over the closed relay contact R7*a*, the make contact 91 and the relay coil R8S to the positive pole of the current source. This will energize the relay R8 so that a make contact R8*a* in this relay connects the positive pole of the current source to the trigger circuit MV2 over series-connected make contacts XS2, YS2 and ZS5 in the switches XS, YS and ZS, respectively which are actuated with the said make contacts in closed state when the initial table (or another selected table) occupies the position of presentation. The operation of the relay R8 will also open the break contact R8*b* so that the holding circuit of the relay R7 is opened for the deenergization of the relay R7. The parts then again occupy the positions shown in FIG. 9. In the second case, when the push button 10 is pressed first, the desired signal to the trigger circuit MV2 is obtained as follows. Each push button 10 has a make contact 92 which when closed supplies current to the coil R9S of a relay R9, as will appear from FIG. 9. The relay R9 is operated and is held energized via a make contact R9*b* and a break contact R10*b* of a deenergized relay R10. The operation of the relay R9 will also close a make contact R9*a* so that the relay R10 is operated when a make contact 93 is closed at the actuation of the selected push button 9. Current will thereby be supplied to the coil R10S of the relay R10 from the negative pole of the current source through the contact 93, the contact R9*a* and the coil R10S to the positive pole of the current source. The operation of the relay R10 will close a make contact R10*a* which connects the positive pole of the current source to the trigger circuit MV2 via the series-connected closed switches XS2, YS2 and ZS5. The operation of the relay R10 will open the break contact R10*b* so that the relay R9 looses its holding. As a consequence, the relays R9 and R10 are again deenergized so that the parts return to the positions shown in FIG. 9.

When the selected line push button 9 is pressed the desired Y address is fed through the make contact or contacts 59 operated by said push button and through conductors 57 into the Y register 58 over the relay contacts 84 which have been reset to the positions shown in FIG. 9 at the deenergization of the relay R4, said deenergization taking place when the operator released the patient button 2. When the selected column push button 10 is pressed two bits of the desired Z address are fed directly into the Z register 54 by means of the make contact or contacts 56, closed through the push button 10, over the conductors 55 and the relay contacts 84 which after deenergization of the relay R4 have been set into the positions shown in FIG. 9. The remainder of the Z address and the full X address is read by the photo-cell or sensing means 48 from the code rectangles 120 on the initial table taking the position of presentation and are applied to the gates 50, 53 over the conductors 49, 52 and the relay contacts 84 occupying the positions shown in FIG. 9. When the relay R8 or R10 upon operation in the earlier described manner sends a signal to the trigger circuit MV2 said circuit delivers a pulse through its output 88 for opening the gates 50, 53 so that the full X, Y and Z addresses are set in the registers 51, 54 and 58, for actuation of the unit 61, so that the addresses in their entirety or to a desired part are transferred to the desired cells in the instruction word register 77, and for the actuation of the trigger circuit MV3, so that this circuit initiates the table changing device in the manner earlier described. When the reversing movements in the X, Y and Z senses have been accomplished the make contacts XH6, YH6 and ZH4 are temporarily closed so that the monostable trigger circuit MV4 momentarily opens the gate sets 64, 69 and 74 for a new adjustment of the tabulating devices XT, YT and ZT (FIG. 5). When the table now addressed has reached the position of presentation so that the make contacts XS2, YS2 and ZS5 have been closed the operator can effect the selection of a new table by pressing a line push button 9 and a column push button 10 whereupon the cycle described above is again performed.

When the last table of a series of notions has been reached the cycle changes somewhat, for after this table has been dealt with a change-over to the initial table is to be effected irrespective of the notion selected in each particular case in the last table, although the information obtained by the selection of notions of course is to be supplied to the instruction word register. The last table in each possible series of notions has a transparent rectangle 120 (in all other tables of the series the corresponding rectangles are non-transparent) which causes a photocell of the sensing means 48 to energize the coil R6S of the relay R6 over a conductor 94. As a result the relay R6 will be operated so that its break contact R6*a* is opened, whereby the trigger circuit MV2 loses its connection with the trigger circuit MV3 that initiates the table changing device. When a notion is selected from the last table of a series of notions by actuation of a push button 9 and a push button 10, the information is fed from the make contacts 56, 59 operated by the push buttons directly into the registers 54 and 58 in the manner earlier described, and the information obtained from eight of the code rectangles 120 of the table is fed into the registers 51 and 54 through the gates 50 and 53 when these are opened by a pulse from the trigger circuit MV2 which is made operative by the relay R8 or R10 when the push buttons 9 and 10 are pressed. As earlier mentioned, the pulse from the trigger circuit MV2 cannot, however, reach the trigger circuit MV3 because the break contact R6*a* in the energized relay R6 is kept open. Therefore, no change of tables is initiated, and the information in the registers 51, 54 and 58 is not either forwarded to the tabulating devices XT, YT and ZT because the table changing device is not initiated and the make contacts XH6, YH6 and ZH4 then cannot either be closed to make operative the trigger circuit MV4 controlling the gates 64, 69 and 74.

If the operator wants to supplement the instruction word assembled in the instruction word register 77 with some further notions: he may wish to have the patient's biographical data typed out together with the message ordered and have a copy of the message typed out on the typewriter of his own department; the operator for this purpose presses the necessary buttons, in the case exemplified the push buttons 3 and 6 shown in FIGS. 1 and 9. As will appear from FIG. 9 the operator's pressing these buttons results in that there is applied to certain cells in the instruction word register 77 by means of contacts controlled by said buttons a positive voltage for storing the desired information in the register.

After the desired instruction word has been assembled in the manner described in the instruction word register 47 it is to be transferred to the data processing (not shown) via the requisite number of conductors, some of which are shown by broken lines 95 in FIG. 9. The instruction word assembled in the register 77 is supplied to said conductors and the register is zeroised when an input line 96 to the register is temporarily connected to the positive pole of the current source through the closing of a make contact 97 by the operator's pressing the "Go" push button 7. The pressing of the "Go" push button 7 will also close a make contact 98 that establishes connection between the trigger circuits MV2 and MV3 although the relay R6 is temporarily operated and keeps the break contact R6*a* open. When the "Go" push button 7 is pressed the break contact 7*a* will also be opened so that the holding circuit of the relay R3 is opened, whereby the relay is deenergized and the lamp 82 is extinguished so that the presentation of tables in the picture window 8 (FIG. 1) ceases. The pressing of the "Go" push button 7 will also close two make contacts 99 and 100. Closing of the contact 99 will operate the relay R4 so that the contacts 84 are set from the positions shown in FIG. 9 into application with the fixed contacts 85 which supply the address of the initial table to the registers 51, 54 and 58. Closing of the make contact 100 will make the trigger circuit MV1 operative so that the full address of the initial table is introduced in the earlier described manner into the registers 51, 54, 58 and so that the trigger circuit MV3 is made operative over the contact 98 closed by means of the "Go" push button 7. The table changing device is thus initiated by the trigger circuit MV3. When the contacts XH6, YH6 and ZH4 are closed during the function of the table changing device in the manner earlier described, the trigger circuit MV4 is made operative so that the address of the initial table contained in the registers 51, 54 and 58 is fed to the tabulating devices XT, YT and ZT. When the initial table has reached the position of presentation the table changing device is stopped in the manner earlier described, and the entire apparatus occupies what is called the normal initial position with the initial table in position of presentation but with the optical system inoperative. All switch contacts in FIGS. 8 and 9 are shown in this normal initial position.

When the apparatus is then to be utilized for assembling a new instruction word it is not necessary that the patient button 2, as earlier described, actuates the relay R4 and the trigger circuit MV1 since the fixed address of the initial table has already been fed into the registers 51, 54, 58 and fully, partly or not at all into the instruction word register 77 at the immediately preceding actuation of the "Go" push button, as described above. The initial table therefore has a code rectangle 120 which is transparent on this table only and which causes a photocell in the sensing means 48 to energize the operating coil R5S of the relay R5 via a conductor 101 so that the relay R5 is energized and opens the break contacts R5*a* and R5*b*. When a patient button 2 is pressed the information about the patient is thus fed through the conductor or conductors 80 to the instruction word register 77 and the lamp 82 is lighted in the manner earlier described whereas the relay R4 and the trigger circuit MV1, as distinguished from what has earlier been described, are not actuated. The initial table becomes visible in the picture window immediately when the lamp 82 is lighted, and the operator can immediately start selecting a text notion from the initial table by means of the push buttons 9 and 10 and accomplish the assembling of an instruction word in the manner earlier described.

It should be observed that the invention must not be considered restricted to the embodiment described above and shown in the accompanying drawings, for many modifications may be resorted to within the scope of the invention defined in the appended claims, as is readily realized by those skilled in the art. It should be stressed that the tables need not be brought together in a greater or smaller number on one or more diapositive plates but may be arranged—after a suitable modification of the table changing device—in another way, for instance in one or more rows on a film strip with winding mechanism, in a spiral or in one or more rings on one face of a flat transparent rotatable disk, in one or more rings or along a helical line on the circumference of a cylindrical transparent rotatable drum. The optical presentation system need not either necessarily be constituted by a customary projection apparatus, and in this connection it should be particularly stressed that it may sometimes be suitable to show the operator the various tables with the aid of a television picture tube. In this case the tables proper and the table changing device may be set up in other premises than are the television picture tube and the push buttons associated therewith and may be common to several television picture tubes with the pertaining push button sets. It should also be observed that the various text notions in each table may be arranged according to another positioning system than by lines and columns, in which case the push buttons selecting the text notions must be arranged in a manner suitable to the positioning system selected so that by pressing one or more push buttons it is possible clearly to select a definite text notion from each table and consequently to establish, by means of a set of switches operated by the push button or buttons, the information required for the selection of the next following table and for supplementing the instruction word being assembled.

As an example of a somewhat different embodiment of the invention reference is made to FIGS. 10 to 13.

As shown in FIG. 11, the tables 11A are arranged in a row along a microfilm strip 200. Along one margin of the film strip there is a mark 201 adjacent each table. As explained in the following, said mark can be sensed by a photocell for table changing purposes. Just as in the first embodiment each table 11A contains forty-eight text or other information means positions arranged in sixteen lines and three columns, and one or more of said positions has information means, for instance text, interpretable for the operator and representing part notions of instruction words. The film strip 200 may contain hundreds or thousands of tables 11A.

As shown in FIG. 10, the film strip 200 is wound on two reels 202, 203 which are driven by electric motors 204, 205 so that the film strip can be transported between the reels across the optical axis of an optical system for positioning anyone of the tables on the film strip on the optical axis. The optical system has a lighting means 206 projecting light through the film strip table located on the optical axis of the system to a lens 207 which throws a magnified picture of the table on the image screen or picture window 208 so that the operator can interpret or read the information of the table. Light is also projected by the lighting means 206 through the film strip mark 201, belonging to the table positioned on the optical axis, to a photocell 209 for a purpose described in the following. The window 208 may be arranged as in FIG. 1, and nineteen push buttons for the different information means positions of each table may be arranged according to FIG. 1 in line with each row and each column of the information means positions. It is also possible to give each information means position of each table a number from 1 to 48 and arrange forty-eight numbered push buttons adjacent the picture window, preferably in sixteen rows each having three push buttons.

FIG. 12 shows an electric block diagram of the second embodiment of the invention. Here the push buttons 210 are arranged in the last-mentioned manner. FIG. 12 also shows the two drive motors 204 and 205 for winding and unwinding of the film strip (not shown here) for table changing and the photocell 209 for sensing the film strip marks 201 (FIG. 11). The photocell 209 and the motors 204 and 205 are shown connected to a relative address register 211. This register is also shown connected to a memory 212 with rapid access in an electronic computer. Also connected to the memory 212 are the push button set 210, a "Go" push button 214, and a "Start" button 225. There is further connected to the memory a printer 213 electrically controlled by a logic-circuits, said printer being adapted to write a message under the control of an instruction word assembled in the memory 212.

The tables 11A on the film strip 200 (FIG. 11) as address have their successional numbers, counted from one end of the film strip. The register 211 in FIG. 12 is a normal register for relative address, such as extensively used in electronic computers and the like. Therefore it will not be necessary to enter upon a detailed description of the construction of the register 211. For understanding the invention it suffices to describe how a change-over from one table to another takes place. Let us assume that table #26 at the moment is positioned on the optical axis for display in the picture window 208 (FIG. 10). Then the register 211 contains the count 0 and the logic circuits 224 contain the count 26. If in the manner described in the following memory 212 instructs the register 211 to display table #36 instead, the logic circuits 224 will effect the calculation 36—26=10 and set the register 211 at count plus 10 whereby the motor 205 is started for transporting the film strip 200 in one direction, viz, in the direction towards displaying tables having ever higher numbers. During the transport of the film strip the photocell 209 sends a counting pulse to the register 211 for each mark 201 (FIG. 11) that passes through the optical axis, and the register 211 reduces its count by one unit for each such pulse. When the count in the register 211 has reached #0, table #36 is positioned on the optical axis, and the register stops the motor 205. If the next following table has address #7 the logic circuits 224 will effect the calculation 7—36=—29. The calculation giving a negative value, the register 211 is set at count —29 and starts the motor 204 for transporting lower address numbers. The register 211 keeps track of the table changing by means of the photocell 209 during the film transport and stops the motor 204 when table #7 has arrived in position on the optical axis in the projection system.

The memory 212 contains a valid table area 215 framed by broken lines in FIG. 13, and an assembling area 216 also framed by broken lines in FIG. 13. The valid table area 215 contains a table block of information associated with the table 11A (FIG. 11) that is momentarily displayed in the picture window 208 (FIG. 10). The table block of information is arranged in the following way in the valid table area 215 in FIG. 13. In a first section of the valid table area 215 there are forty-eight rows of coded information, one row for each information means position in the table or, which is the same, for each push button 210 (FIG. 12), as indicated by arrows and push button numbers in FIG. 13. In a second section of the valid table area 215 there are forty-eight rows of code notations individually associated with each of the information means in the forty-eight information means positions of the table that is momentarily displayed in the picture window. Each "button row" of the first section of the valid table area 215 has a part 217 containing the address of the next table to be displayed in the picture window, a part 218 containing the address of the next table block of information associated with the table having the address noted in part 217 of the same row, and a part 219 containing the address of one of the code notation rows 220 in the second section of the valid table area 215. The assembling area 216 of the memory contains a large number of cells or rows 221, where code notations from rows 220 may be written in sequence during the assembling of an instruction word.

According to normal electronic computor technique there are, of course, writing means 222, reading means 223 and logic-circuits 224 associated with the computor memory for electrically writing data into and reading data from the rows or addresses of the memory, and for receiving electrical code signals from the push buttons 210, 214, and 225, sending electrical code signals to the relative address register 211 and to the printer 213, and governing the operation of the writing and reading means 222 and 223. As these means are standard components of every computor they have only been indicated as diagrammatic blocks in FIG. 13.

When the operator wants to assemble an instruction word for the printer 213 (FIG. 12) he first depresses the start button 225 which sends a code signal to the logic-circuits 224 (FIG. 13) bringing them according to normal computor programming techniques to transmit the address of a standard starting table to the address register 211 (FIG. 12) and to cause the writing means 222 (FIG. 13) to write the data or table block belonging to the starting table into the valid table area 215 of the memory. The electric code signals for the table block are fed to the writing means 222 by the logic-circuits 224 which receive the signals by instructing the reading means 223 to read the corresponding table block from another area of the memory where all table blocks for the different tables of the film strip 200 (FIG. 11) are stored in individual table block addresses. Alternatively, the table blocks for the different tables of the film strip may be stored in individual addresses of an external memory, for instance a magnetic tape memory (not shown), in which case the logic-circuits 224 of the computor instruct reading means of the external memory to read the starting table block and transmit the generated code signals to the logic-circuits which pass the signals to the writing means 222.

When receiving the starting table address the register 211 (FIG. 12) indexes the film strip in the way already described for positioning the starting table on the optical axis of the projection system so that the starting table is displayed in the picture window. Now, the operator can study the information means or items of the starting table for choosing one of them. It may be assumed that he chooses the item standing in information means position #6 of the starting table. Thus, the operator depresses button #6 of the push button set 210 (FIG. 12) whereby a unique electric position code signal representing information means position #6 is transmitted to the logic-circuits 224. The signal may be made unique by having each push button of the set 210 individually connected to different portions of the logic-circuits 224 which translate the signal according to normal computer techniques into the address of the corresponding "button row" of the valid table area 215 of the memory. Thus, when receiving the position code signal from the depressed push button #6 the logic-circuits 224 instruct the reading means 223 to read "button row" #g of the valid table area 215 of the memory. In doing so the reading means 223 transmit electric code signals representing the parts 217, 218, and 219 of the read "button row" to the logic-circuits 224 which distribute the code signals in the following way according to normal programming techniques for the computer involved.

The signal representing the part 217 is transmitted to the address register 211 (FIG. 12) as address of the next table so that said register will index the film strip to display the table having the address stored in said part 217. The signal representing the part 218 is used to generate signals for bringing the reading means 223 to read the table block corresponding to the new table from a storage area of the memory as previously explained (or for bringing the reading means of an external memory to read the corresponding table block from the external memory) and for bringing the writing means 222 to write the new table block into the valid table area 215 as a replacement for the starting table block. The signal representing the part 219 is used to generate signals for bringing the reading means 223 to read the code notation of the row 220 that has the address stated in part 219, for instance code notation $n+1$ shown in FIG. 13. Of course, the code notation is read from the row in question of the valid table area 215 before the starting table block is removed from said area and replaced by a new table block. The code notation read by the reading means 223 is transmitted as an information signal by the logic-circuits 224 to the writing means 222 which are caused by the logic-circuits to write the information signal as a first assembled instruction section in the first row 221 of the assembled area 216. The code notation read is also transmitted to the printer 213 to be printed as a receipt for the operator.

When the new table is displayed in the picture window, the operator chooses an item of the displayed table by depressing the corresponding push button 210 (FIG. 12) which starts a new operating cycle of the nature described, involving a change of table and associated table block and the writing of a second code notation as a second assembled instruction section in the second row 221 of the assembling area 216. These activities are repeated a number of times with a new table each time until the operator has assembled a complete instruction word in the assembling area 216. Then, the operator depresses the "Go" push button 214 (FIG. 12) which sends a signal to the logic-circuits 224 (FIG. 13) bringing them to instruct the reading means 223 to read the data assembled in the assembling area 216. The data read are transmitted by the logic-circuits 224 to an external memory for instance a magnetic tape memory for future use as an instruction word for instance for controlling the printer 213.

Instead of using one button 210 (FIG. 12) for each information means position of the tables it is possible to have said positions numbered and to use ten buttons numbered 0 to 9 which are pressed consecutively for forming the number of the information means position wanted. The signals from the digit buttons are assembled in a buffert register for the logic circuits 224 (FIG. 13) before they are used as the unique position code signal for controlling the logic-circuits as previously described. In this modified embodiment the buffert register may generate said unique position code signal automatically after depression of a predetermined number of digit buttons or said signal may be generated after depressing any number of digit buttons. In the last mentioned case the operator must depress an end of coding key after actuation of the wanted number of digit buttons to bring the buffert register to generate the unique position code signal.

What I claim and desire to secure by Letters Patent is:

1. Apparatus for assembling in cells of a memory of instruction words such as instruction word to be supplied to an apparatus controlled by logic-circuits, comprising a plurality of picture frames, a picture frame changing apparatus, in which said picture frames are stored under individual picture frame addresses, a display position, positioning means responding to an electric picture frame address signal for positioning the picture frame corresponding to the picture frame address signal in said display position, a picture window, means for presenting in said picture window to an operator an image of the picture frame localized in said display position, a plurality of information means on each of said picture frames, a set of code tag means on each of said picture frames, said set of code tage means being the same for all of said picture frames, said plurality of information means on each of said picture frames being individually associated with one of said code tag means of the set, said information means and said code tag means being interpretable for the operator in said window and each information means representing a part notion of a great many possible instruction words to be supplied to the apparatus controlled by logic-circuits, electrically readable code notations individually associated with each of said picture frames and belonging to said plurality of information means on said picture frames, reading means for electrically reading said code notations for generating a code notion signal, manually operable code signal generating means, being manually adjustable by the operator into a plurality of operating positions, one for each code tag means of said set presented to and interpretable by the operator in said window, for generating one unique electric code signal for each code tag means of said set, electronic logic-circuits operable (1) by means of the electric code signal generated upon adjusting said code signal generating means into one of their operating positions and (2) by means of the code notion signal generated by said reading means upon reading the pertaining code notion, for generating (A) the picture frame address signal for picture frame changing and (B) an information signal, and means for transferring the picture frame address signal to said positioning means and for transferring the information signal to cells of the memory of instruction words and storing it in the cells.

2. Apparatus for assembling in cells of a register of instruction words such an instruction word to be supplied to an apparatus controlled by logic-circuits, comprising a plurality of picture frames, a picture frame changing apparatus, in which said picture frames are stored, individual address means in said picture frame changing apparatus for each of said picture frames, a display position, positioning means for positioning a selected one of said picture frames in said display position, a picture window, means for presenting in said picture window to an operator an image of the picture frame localized in said display position, a set of symbols on each of said picture frames to be displayed in said window to the operator, each symbol representing a primary part notion of a great many possible instruction words to be supplied to the apparatus controlled by logic-circuits, code means on each picture frame, representing a secondary part notion common to the primary part notions represented by said symbols on the associated picture frame, sensing means at said display position for sensing said code means on the picture frame localized in said display position and generating corresponding electric secondary code signals, manually operable code signals generating means, being manually adjustable by the operator into a plurality of operating positions, one for each symbol of said set of symbols of any of the picture frames presented to the operator in said window, for generating one unique electric primary code signal for each operating position, electric means for electrically transmitting at least a certain part of each of the primary and secondary code signals, pertaining to the picture frame presently presented in said window to the operator, to definite cells of the instruction word register and for electrically transmitting at least a certain portion of each of the last-mentioned primary and secondary code signals as a picture frame address to said address means of said picture frame changing apparatus, and means for operating said picture frame changing apparatus to cause this apparatus to move the picture frame having the address supplied to said address means of said picture frame changing apparatus into said display position.

3. Device as claimed in claim 2, in which said set of symbols of each picture frame are arranged in lines and columns and a plurality of manual operating means are provided for adjusting said code signal generating means, of which operating means there is one for each line and one for each column in any one of said picture frames.

4. Device as claimed in claim 3, in which said manual operating means associated with the lines being arranged adjacent said window aligned with the respective line, shown in said window, of any one of the picture frames, and said manual operating means associated with the columns being arranged adjacent said window aligned with the respective column, shown in said window, of any one of the picture frames.

5. Device as claimed in claim 2, in which said electric means comprise holding register means, means for entering said primary and secondary code signals, generated by means of each picture frame presented in said window, into said holding register means, and means for forwarding said part and portion, respectively, of said primary and secondary code signals from said holding register means to the instruction word register and said address means of said picture frame changing apparatus, respectively.

References Cited

UNITED STATES PATENTS

| | | | |
|---|---|---|---|
| 3,335,411 | 8/1967 | Sinn | 340—172.5 |
| 3,324,458 | 6/1967 | MacArthur | 340—172.5 |
| 3,281,788 | 10/1966 | Hernan et al. | 340—172.5 |
| 3,252,143 | 5/1966 | Sundblad | 340—172.5 |
| 3,195,399 | 7/1965 | Jonker | 340—172.5 |
| 3,191,006 | 6/1965 | Avakian | 340—172.5 |
| 3,098,119 | 7/1963 | Lemelson | 340—172.5 |
| 3,071,753 | 1/1963 | Fritze et al. | 340—172.5 |
| 3,036,291 | 5/1962 | Whittle et al. | 340—172.5 |

GARETH D. SHAW, Primary Examiner